May 16, 1933.  K. K. LEDIG  1,908,990
OPTICAL INSPECTION APPARATUS
Filed Dec. 18, 1930
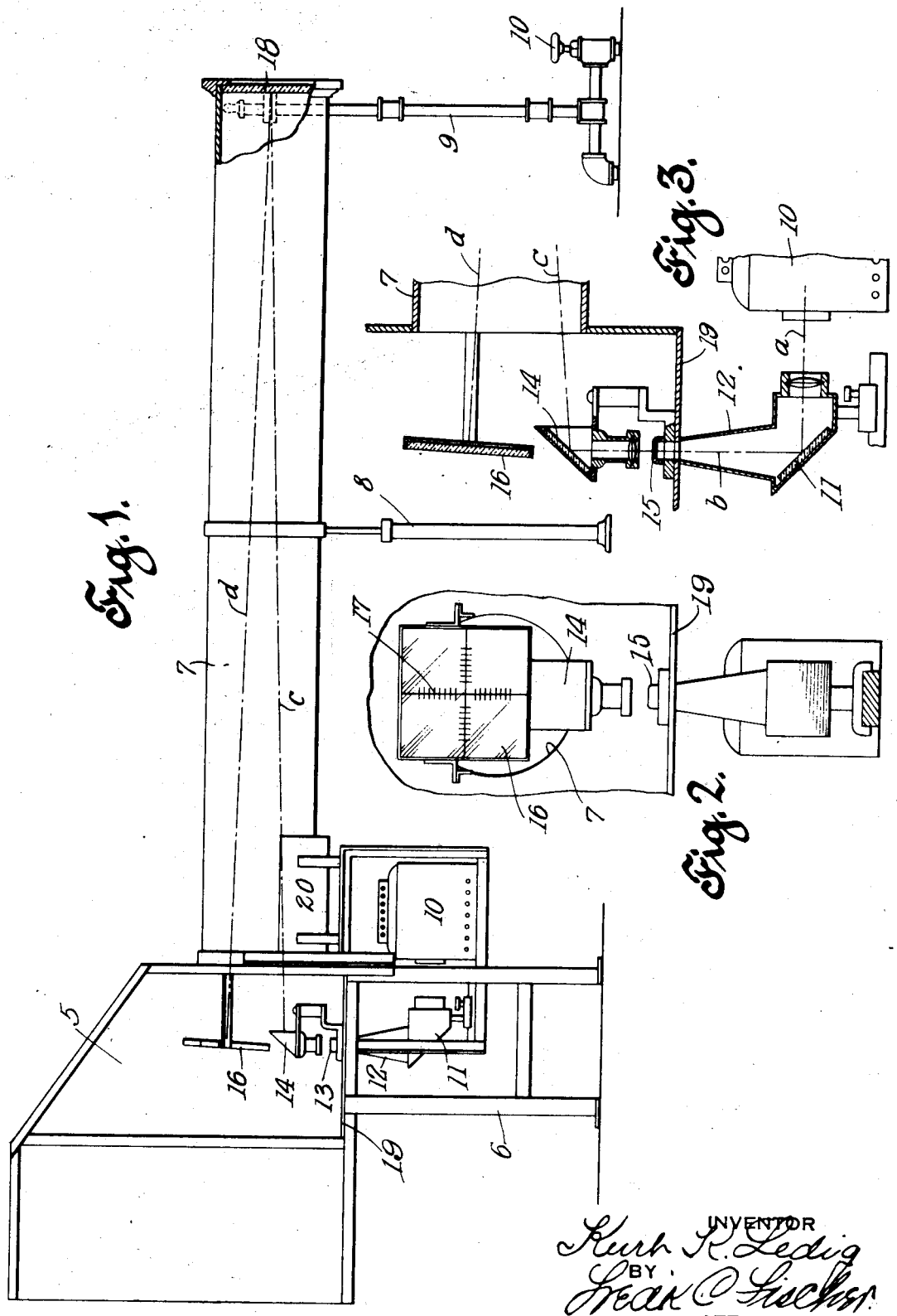
INVENTOR
Kurt K. Ledig
BY
Fred C. Fischer
ATTORNEY Patented May 16, 1933

1,908,990

UNITED STATES PATENT OFFICE

KURT K. LEDIG, OF NEWARK, NEW JERSEY, ASSIGNOR TO AMERICAN PLATINUM WORKS, OF NEWARK, NEW JERSEY, A CORPORATION OF NEW JERSEY

OPTICAL INSPECTION APPARATUS

Application filed December 18, 1930. Serial No. 503,141.

This invention relates to optical inspection apparatus and more particularly to improvements in such apparatus in which an image of the article being inspected is projected upon a screen.

Heretofore, in apparatus of this type images have been projected upon screens positioned at about ten feet from the operator, or in some cases the screen has been positioned to the side of the operator. Inasmuch as the object being inspected is usually not more than twenty-five centimeters from the eye of the operator, the constant changing of the focus of the eye of the operator from the object to its image on a screen, causes great fatigue, resulting in inefficient inspection, at the same time materially retarding the speed of inspection.

When the screen is positioned alongside of the operator, similar fatiguing effects obtain, since the operator must continually shift his head from a down position to an up and side position.

It is an object of this invention to provide an optical inspection apparatus in which the projection screen is positioned at approximately the same distance from the eye of an operator as the object being inspected.

A further object is the provision of an inspection apparatus in which the projection screen is positioned in line with and immediately above the object being inspected.

A further object is the provision of an inspection apparatus in which the parts are so arranged as to require a minimum amount of space and facilitate assembling and adjustment.

These and other advantageous objects, which will later appear, are accomplished by the simple and practical construction and arrangement of parts hereinafter described and exhibited in the accompanying drawing, forming part hereof, and in which:

Figure 1 represents a side elevational view of the inspection apparatus.

Figure 2 represents a partial front elevational view of the apparatus.

Figure 3 represents a sectional side elevational view of elements in the apparatus.

Referring to the drawing, the inspection apparatus is shown to comprise vertical supports 6 for a table 19 upon which is mounted a bracket 13 for holding the object being inspected and supporting an inclined mirror 14.

Supported by the members 6 at the other side of the table is a balopticon 10 of a well known type including a lamp, which throws a light upon an inclined mirror and lens arrangement 11 which projects the light through a tube 12 to the object 15 supported by the bracket 13.

As will be seen in Figure 3 the path of the light leaving the balopticon 10 is designated by the dotted line $a$. The light is diverted by the inclined mirror 11 and then follows the path as shown by dotted line $b$, which passes through or around the object 15 being inspected until it reaches the inclined mirror 14 from whence it is diverted to follow the path shown by the dotted line $c$.

The projected image of the object 15 which is now following the path $c$ strikes the mirror 18 from which it is reflected along the path $d$ onto a screen 16 which is provided with various markings 17.

The screen 16 is immediately above the mirror 14 and the object being inspected 15, and the rays $c$ and $d$ are in the same vertical plane.

The mirror 18 is at the far extremity of the large tube 7 which is mounted upon the supports 6, 8 and 9; the support 9 being vertically adjustable by means of a screw and nut arrangement indicated at 10.

This apparatus is designed especially for inspection of very small articles and the projections upon the screen 16 indicate readily, by the marking 17, any deviations from the specified size and shape of the article being inspected. For example, in the manufacture of spinerets, such as used in the production of rayon fibres, the apertures in the spinerets are very small, approximately .003 inch in diameter, and must be as round as possible in order that the fibres may be perfect in shape. Imperfections in the shape of the apertures in the spinerets will cause grooves and irregular shaped fibres which have a marked effect in cloth made therefrom. Consequently, the apertures are made with drills which are as near as possible circular in cross section, and by means of the inspection apparatus herein disclosed any deviation of the drills from the circular outline may be readily noted so that they may be corrected. Imperfectly shaped apertures in spinerets may also be readily discovered.

The apparatus also is applicable to the inspection of filaments as used in incandescent lamps and other electrical apparatus in order to discover any deviation from standard sizes and shapes, and for the inspection of diamond, drawing or other dies, for the inspection of small drills, taps, punches and the like.

Inasmuch as articles being inspected are exceedingly small, it is obvious that any means which will lessen the fatigue to the operator, will also increase the efficiency of the inspection. Also photographs may be made of the image on the screen for permanent records.

It will be readily seen that the screen 16 and the object 15 are at approximately the same distance from the eye of the operator, and consequently, it is not necessary for the operator to continually adjust the focus of his eyes in order to see the object and then its image on the screen.

As a result, the inspection operation is not fatiguing and the operator is enabled to more rapidly and efficiently perform his task. Also since the screen and object being inspected are substantially in alignment, the operator does not have to move his head continually, it only being necessary to slightly shift the eyes in order to see either the projected image or the object.

By providing a long tube, the apparatus may be used in broad daylight in any room, and a special dark room is not necessary, it being sufficient to shield the screen and the object from extraneous light.

In order to protect the tube and other parts from the heat of the balopticon, an aluminum shield 20 is provided.

The foregoing disclosure is to be regarded as descriptive and illustrative only, and not as restrictive or limitative of the invention, of which obviously an embodiment may be constructed including many modifications without departing from the general scope herein indicated and denoted in the appended claim.

Having thus described my invention, What I claim as new and desire to secure by Letters Patent, is:

In an apparatus of the class described, a projector including a lamp, a lens for receiving a beam of light from the projector, means for supporting an object to be tested in the focal plane of said lens between said lens and projector, a screen positioned directly above the object and in the same vertical plane therewith, a tube having one end adjacent the screen and object, a mirror mounted in the opposite end of the tube for receiving the image projected through the lens and to reflect said image on to the screen, said tube being positioned above the lamp in the projector, and a shield positioned directly above the lamp and below the tube to protect the tube from heat generated by the lamp.

KURT K. LEDIG.